Jan. 11, 1955  G. E. HANSEN ET AL  2,699,179
PRESSURE ACTUATED VALVE
Filed March 3, 1952
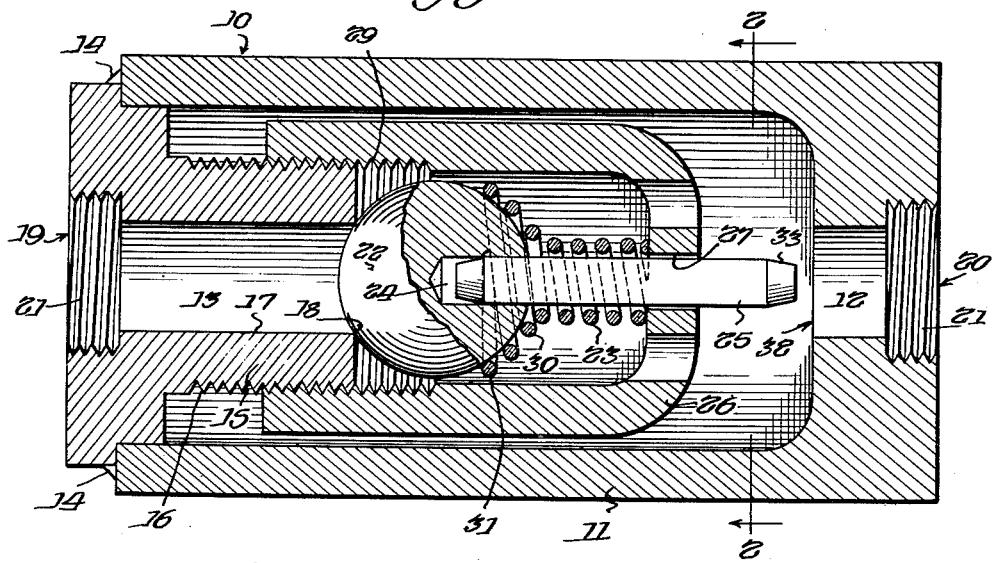
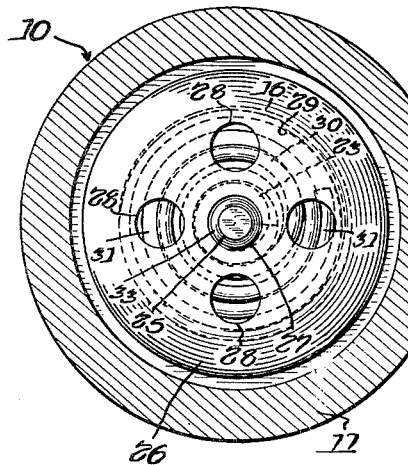
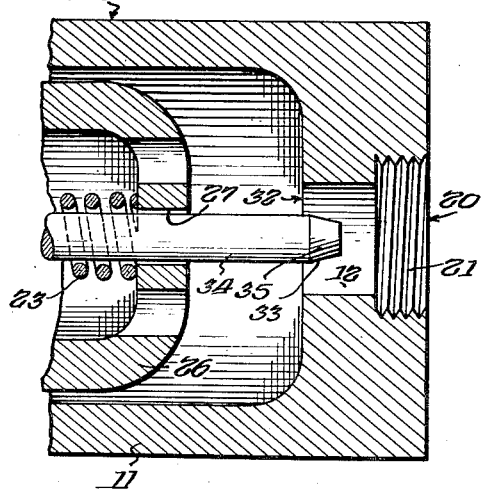
Inventors.
George E. Hansen, &
John A. Paulius, Jr.
By Joseph O. Lange
Atty.

United States Patent Office 2,699,179
Patented Jan. 11, 1955

2,699,179

PRESSURE ACTUATED VALVE

George E. Hansen, Elmwood Park, and John A. Paulius, Jr., Chicago, Ill., assignors to Crane Co., Chicago, Ill., a corporation of Illinois Application March 3, 1952, Serial No. 274,542

4 Claims. (Cl. 137—539)

This invention pertains to pressure actuated valves or similar device, and, more particularly, relates to a device for the control of fluid flow.

In order to obtain a better appreciation of this invention, it should be understood that it is often necessary in the laboratory or in factory processing or treating in industry to provide for the emission or discharge of more or less definite amounts of fluid at desired time intervals. The device embodying the present invention is of the nature of a check valve, but it serves the purpose in connection with a pulsating fluid pressure at the inlet side or a vacuum pull at the outlet side of metering certain amounts of fluid at desired intervals.

Another objective is to produce a device of the nature disclosed in which the amount of fluid passing therethrough at any one time is adjustable. More specifically, the compression of a resilient member or spring behind a closure or valve member is adjustable by the axial movement of an enclosing and generally cup-shaped cage member on or with respect to a member providing a valve seat. This adjustment may be accomplished by any suitable means. In the preferred embodiment hereinafter illustrated, a threaded connection has been used. It is often necessary after an original setting has been made to readjust or change the compression of the spring. To facilitate this change, an outer casing may be used which is readily separable as by unclamping or unscrewing or, where toxic fluids and vapors are present, such as sodium for example, and a permanently sealed, welded connection is used, adjustment may be had through an outlet in the casing upon disconnection of the fluid line.

A further object of the present invention is the elimination of chattering so often present in valves of this type. This objectionable trait frequently continues in spite of the use of a guided valve and a spring under rather high compression. It has been discovered that a spring which closely fitted around a valve stem or pin for increased guiding and lateral stability will virtually eliminate chattering if the end adjacent a spherical or spheroidal valve member, for instance, were cup-shaped to receive and resiliently support the rear surface of such member as by making the coil diameters progressively larger towards the end, the last coil giving substantial support to the valve member slightly to the rear of the largest circumference thereof. Inasmuch as this support is to the outside of or beyond the circular valve seat, better guiding and reseating of the valve member is provided, in addition to elimination of chattering while open. It was also noted that in the case of a fluid having a tendency to cake or build up a residue or deposit, the slight movement of the valve stem through the cage member and the closely fitting spring and also the compression and expansion of the latter was sufficient in most cases to keep the valve stem clean and to loosen or break up any formation of such deposits on the spring.

The use of a spherical or spheroidal shaped valve element in connection with the shaped spring described, rather than a straight conical spring, for instance, also tends to produce better flow characteristics. Improved flow is also increased by symmetrically arranged fluid apertures in the end of the cage member and also by the extension of the valve guide therethrough and within close proximity of or slightly into the mouth of the outlet or discharge port in the outer casing. Such extension appears to swirl or otherwise direct the flow into the outlet lessening eddy currents and turbulence. In the case of large valves or where the flow is very critical, the end of the guide pin may be beveled, rounded, or pointed. Regarding the fluid apertures in the cage member, these may be of any shape or number as required by the particular use intended.

It is seen that the valve construction related permits substantially straight-line or axial flow with a minimum of resistance and turbulence and that the unique form of spring combines the function of urging the valve to its seated or closed condition, or providing additional guidance through its close support of the guide pin and of serving as a seat or resilient support for the valve member holding it firmly on the line contact valve seat and against disturbing forces tending to cause valve chatter.

Although the present device is used in a closed fluid system in the manner above related for the flame reduction of titanium, for example, the said device could also discharge into atmosphere serving as an exhaust valve; or, the same could be used as an adjustable check valve.

Other objects and advantages will become more readily apparent upon proceeding with the following description read in light of the accompanying drawings, in which Fig. 1 is a sectional assembly view of the device taken through the longitudinal axis thereof.

Fig. 2 is a transverse cross section taken on the line 2—2 of Fig. 1 and in the direction indicated.

Fig. 3 is a fragmentary portion of the outlet end showing a modification in which a slightly longer guide pin is used which extends into the mouth of the outlet.

Similar reference numerals refer to similar parts throughout the several views.

Referring to the drawing, and particularly to Fig. 1 thereof, 10 is a casing consisting of a cylindrical shell or body member 11 which is open at the front end and includes a circular outlet 12 in the center of the opposite end, and an inlet member 13 of circular form which is secured in and around the open end of the body member 11 as by welding at 14. It is understood that other attachment means may be employed which will permit separation when desired, such as by bolting, clamping, or by the use of a threaded connection. The inlet member 13 is provided with an axial extension 15 also of circular form which is threaded on the periphery at 16. An axial passage or aperture 17 extends through the inlet member 13, the inner edge portion 18 of which forms substantially a line contact valve seat. This edge or valve seat portion 18 may be integral or it may be a separate insert or ring-like element if desired. The outer end of the passage or aperture 17 and also the outlet 12 may be counterbored at 19 and 20 respectively, for connection to or reception of fluid lines. Internal threading 21 or other suitable attachment means may be employed in making these connections.

A spherical or substantially spherical ball valve member 22 is normally positioned over the valve seat at 18, urged to this position by means of the compression spring 23. The valve member may be spheroidal or otherwise shaped for fluid flow or partly spherical or spheroidal or flattened and having a substantially spherical or spheroidal seating portion without going beyond the spirit of this invention. The valve member 22 is recessed axially from the opposite side as indicated in the drawing at 24, and a valve guide pin 25 is preferably press-fitted thereinto. This pin passes through the compression spring 23 and also a bore 27 in an adjustably mounted cage member 26. The latter member contains a plurality of apertures 28 annularly arranged around the bore 27 for the passage of line fluid. The wall portion of the cage member is cylindrical in form, is solid, and extends forward towards the inlet, enclosing the spring 23 and valve member 22, and being adjustably mounted on the extension 15 of the inlet member 13 as by threading at 29. The axial relationship of these two members adjusted by the rotation of one upon the threads of the other determines the compression of the spring 23 and consequently the amount of fluid passing or drawn through the valve before reseating.

The portion of the spring 23 around the guide pin is of only slightly larger diameter than that of the guide pin, thus fitting relatively closely for the purpose of cleaning said pin and keeping it free from caking and also affording additional guiding and lateral stability for the closure member. Actually in some cases, the clearance illustrated between the spring coils 23 and the guide pin 25 may be substantially less than that shown and may even be reduced to provide a sliding contact therebetween. The forward portion 30 of the spring proximate the valve member 22 is cup-shaped so as to receive, closely fit around and resiliently support the spherical rear surface thereof, the last coil 31 thereof being the largest in diameter and supporting the valve member slightly to the rear of the plane of greatest circumference. It has been found that this structure besides aiding in the guidance and seating of the valve member virtually eliminates objectionable valve chatter during fluid flow.

The guide pin 25 extends beyond the bore 27 in the cage member 26 and within close proximity of the inner edge or face 32 of the outlet 12. The end of the pin may be perfectly flat or it may be tapered, as at 33, or rounded or pointed, if desired. The pin may also be made longer so as to extend within the outlet 12 and beyond the inner edge or face 32 thereof, shown in Fig. 3. In this embodiment, the guide pin is designated by the numeral 34 and the end thereof by the numeral 35. It has been found that the use of the extended guide pin to position predeterminately within close proximity of or slightly within the outlet appears to divert or otherwise direct the flow into the outlet with a lessening of objectionable eddy currents and turbulence.

Thus, it is apparent that a novel metering valve or similar device has been produced which combines the feature of adjustability with those of a guided valve member having a self-cleaning, non-caking guide pin, a non-chattering resilient seat or support for the valve member, and a generally axial, non-turbulent fluid flow around the spherical valve member, past the resilient support, through the cage apertures and into the outlet port.

The present device may be used without the shell or body member 11 and extended valve guide if desired, such device then being used separately or inserted or mounted in a larger casing or housing for cooperation with other devices or apparatus.

Accordingly, it should be obvious that while several embodiments have been shown or described, the invention is capable of taking form in still other exemplifications. It is therefore the desire to be limited only by the scope of the appended claims.

We claim:
1. A pressure actuated valve comprising a casing having an inlet and an outlet, a valve seat formed in said inlet, a substantially spherical valve member cooperating with said seat, a hollow cage member having a closed end with at least one aperture for the passage of fluid and a central bore, said cage member defining with said valve member a flow path therebetween for the passage of fluid, said cage member being adjustably mounted in the casing, said valve member having an axial extension slidably mounted in said central bore, a compression spring comprising a plurality of coils closely fitted around said axial extension and abutting the closed end of the cage member and the opposed portion of the valve member, said spring having at least two coils which are of progressively larger coil diameter and which closely fit about the spherical surface of the valve member to thereby resiliently hold said valve member against chatter during fluid flow.

2. A pressure actuated valve comprising a casing having an inlet and an outlet, a valve seat formed in said inlet having an inwardly projecting threaded portion, a substantially spherical valve member cooperating with said seat, a hollow cage member having a closed end with at least one aperture for the passage of fluid and a central bore, said cage member defining with said valve member a flow path therebetween for the passage of fluid, said cage member engaging said inwardly projecting threaded portion and being mounted thereon for axial adjustment relative to the said casing, said valve member having an axial extension slidably mounted in said central bore, a compression spring comprising a plurality of coils closely fitted around said axial extension and abutting the closed end of the cage member and the opposed portion of the valve member, said spring having at least two coils which are of progressively larger coil diameter and which closely fit about the spherical surface of the valve member to thereby resiliently hold said valve member against chatter during fluid flow.

3. A pressure actuated valve comprising a casing having an inlet and an outlet, a valve seat formed in said inlet, a substantially spherical valve member cooperating with said seat, a hollow cage member having a closed end with at least one aperture for the passage of fluid and a central bore, said cage member defining with said valve member a flow path therebetween for the passage of fluid, said cage member being adjustably mounted in the casing, said valve member having an axial extension slidably mounted in said central bore, a compression spring comprising a plurality of coils closely fitted around said axial extension and abutting the closed end of the cage member and the opposed portion of the valve member, said spring having at least two coils which are of progressively larger coil diameter and which closely fit about the spherical surface of the valve member to thereby resiliently hold said valve member against chatter during fluid flow, the said axial extension comprising a guide pin relatively closely fitted within the said coil spring whereby to keep the pin free from caking and provide additional guiding and lateral stability for the said valve member in the course of movement of the latter member.

4. A pressure actuated valve comprising a casing having an inlet and an outlet, a valve seat formed in said inlet, a substantially spherical valve member cooperating with said seat, a hollow cage member having a closed end with at least one aperture for the passage of fluid and a central bore, said cage member defining with said valve member a flow path therebetween for the passage of fluid, said cage member being adjustably mounted in the casing, said valve member having an axial extension slidably mounted in said central bore, the said outlet defining with the casing an annular shoulder with which the said valve extension cooperates in the course of its movement, a compression spring comprising a plurality of coils closely fitted around said axial extension and abutting the closed end of the cage member and the opposed portion of the valve member, said spring having at least two coils which are of progressively larger coil diameter and which closely fit about the spherical surface of the valve member to thereby resiliently hold said valve member against chatter during fluid flow.

References Cited in the file of this patent

UNITED STATES PATENTS

| 1,013,246 | Wheeler | Jan. 2, 1912 |
| 1,488,799 | Smith | Apr. 1, 1924 |
| 1,725,674 | Rosenfield | Aug. 20, 1929 |
| 2,170,478 | Long et al. | Aug. 22, 1939 |

FOREIGN PATENTS

| 21,626 | France | 1921 |
| 849,370 | France | Oct. 11, 1939 |
| 429,484 | Great Britain | 1935 |